US010215949B2

(12) United States Patent
Lee et al.

(10) Patent No.: US 10,215,949 B2
(45) Date of Patent: Feb. 26, 2019

(54) LENS ASSEMBLY

(71) Applicant: LG INNOTEK CO., LTD., Seoul (KR)

(72) Inventors: Hee Jung Lee, Seoul (KR); Jin Mi Noh, Seoul (KR); Won Ha Moon, Seoul (KR); Seok Bae, Seoul (KR); Jong Hyuk Lee, Seoul (KR); Hyun Ji Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 15/566,368

(22) PCT Filed: Apr. 14, 2016

(86) PCT No.: PCT/KR2016/003899
§ 371 (c)(1),
(2) Date: Oct. 13, 2017

(87) PCT Pub. No.: WO2016/167574
PCT Pub. Date: Oct. 20, 2016

(65) Prior Publication Data
US 2018/0088295 A1    Mar. 29, 2018

(30) Foreign Application Priority Data

Apr. 16, 2015  (KR) .................. 10-2015-0053802
Jul. 20, 2015   (KR) .................. 10-2015-0102564

(51) Int. Cl.
| G02B 23/16 | (2006.01) |
| G02B 7/02  | (2006.01) |
| G03B 17/08 | (2006.01) |
| G02B 1/14  | (2015.01) |
| G02B 1/18  | (2015.01) |

(52) U.S. Cl.
CPC ............. *G02B 7/02* (2013.01); *G02B 1/14* (2015.01); *G02B 1/18* (2015.01); *G03B 17/08* (2013.01)

(58) Field of Classification Search
CPC .. G02B 13/0045; G02B 9/64; G02B 27/0006; G02B 7/02
USPC ................. 359/513, 811, 819, 829
See application file for complete search history.

(56) References Cited

U.S. PATENT DOCUMENTS

| 2003/0214733 A1 | 11/2003 | Fujikawa et al. |
| 2005/0195503 A1* | 9/2005 | Chen ............ G02B 1/115 359/819 |
| 2006/0069312 A1 | 3/2006 | O'Connor |
| 2015/0036037 A1 | 2/2015 | Reed |

FOREIGN PATENT DOCUMENTS

| JP | 2013-029685 A | 2/2013 |
| JP | 2015-018106 A | 1/2015 |

OTHER PUBLICATIONS

International Search Report in International Application No. PCT/KR2016/003899, filed Apr. 14, 2016.

* cited by examiner

*Primary Examiner* — William Choi
(74) *Attorney, Agent, or Firm* — Saliwanchik, Lloyd & Eisenschenk

(57) ABSTRACT

A lens assembly according to an embodiment of the present invention comprises: a housing; a lens received in the housing; a retainer which is coupled to one end of the housing and supports the lens; and a hydrophilic coating layer formed on one surface of the lens and on the retainer.

20 Claims, 16 Drawing Sheets

LENS ASSEMBLY

CROSS-REFERENCE TO RELATED APPLICATIONS

This application is the U.S. national stage application of International Patent Application No. PCT/KR2016/003899, filed Apr. 14, 2016, which claims priority to Korean Application Nos. 10-2015-0053802, filed Apr. 16, 2015, and 10-2015-0102564, filed Jul. 20, 2015, the disclosures of each of which are incorporated herein by reference in their entirety.

TECHNICAL FIELD

The present invention relates to a lens assembly, and more particularly, to a lens assembly having a coating layer formed on a surface thereof.

BACKGROUND ART

A lens disposed at an outermost position in a lens assembly, which is included in a camera module, is exposed to an external environment. Particularly, when a camera module is mounted on a vehicle, an optical characteristic of the camera module may be degraded due to rain, fog, light reflection, dust, and the like, or a field of view of the camera module may be insufficiently secured.

Accordingly, there has been an attempt to coat a lens of a camera module with a water-repellent coating layer. When water-repellent coating is performed on a camera module, water droplets on a lens flow down, and thus an optical characteristic and a field of view of the camera module can be secured.

However, even when with a water-repellent coating, fine droplets cannot flow down in a foggy situation and are thus formed on a lens. As a result, there is a problem in that it is difficult to secure a field of view of a camera module in a foggy situation.

Technical Problem

The present invention is directed to providing a camera module capable of stably securing an optical characteristic and a field of view even in an external environment such as rain, fog, and the like.

Technical Solution

One aspect of the present invention provides a lens assembly including a housing; a lens accommodated in the housing; a retainer coupled to one end of the housing and configured to support the lens; and a hydrophilic coating layer formed on one surface of the lens and formed on the retainer.

The one surface of the lens may be a surface that is exposed to the outside.

The retainer may include a sidewall configured to surround an edge of the surface that is exposed to the outside and protrude in a direction toward an object side.

The sidewall may be inclined with respect to a horizontal plane of the lens.

An angle formed by the sidewall and the horizontal plane of the lens may be 20 degrees or less.

The sidewall may include a recess extending from a boundary between the lens and the sidewall in the direction toward the object side.

The sidewall may have a concave shape.

The hydrophilic coating layer may have a thickness in a range of 1 nm to 100 nm.

The hydrophilic coating layer may include a polymer containing a hydrophilic functional group.

The lens and the hydrophilic coating layer may be covalently bound to each other.

The lens and the hydrophilic coating layer may be covalently bound to each other by O of the lens and Si or C of the hydrophilic coating layer.

The hydrophilic functional group may be selected from the group consisting of a hydroxyl group, an amino group, and epoxy group.

Another aspect of the present invention provides a lens assembly including a housing; a lens accommodated in the housing; a retainer coupled to one end of the housing and configured to support the lens; a hydrophilic coating layer formed on one surface of the lens; and a water-repellent coating layer formed on the retainer.

Advantageous Effects

According to the embodiment of the present invention, a camera module capable of stably securing an optical characteristic and a field of view even in an external environment such as rain, fog, and the like can be secured. Particularly, in a foggy situation, formation of water droplets on an outermost lens of a camera module can be prevented, and formation of water droplets around a boundary between a lens and a retainer can also be prevented. In addition, a lens assembly having high abrasion resistance and high functionality and reliability can be obtained even in high temperature and high humidity circumstances.

MODES OF THE INVENTION

Figure 1:
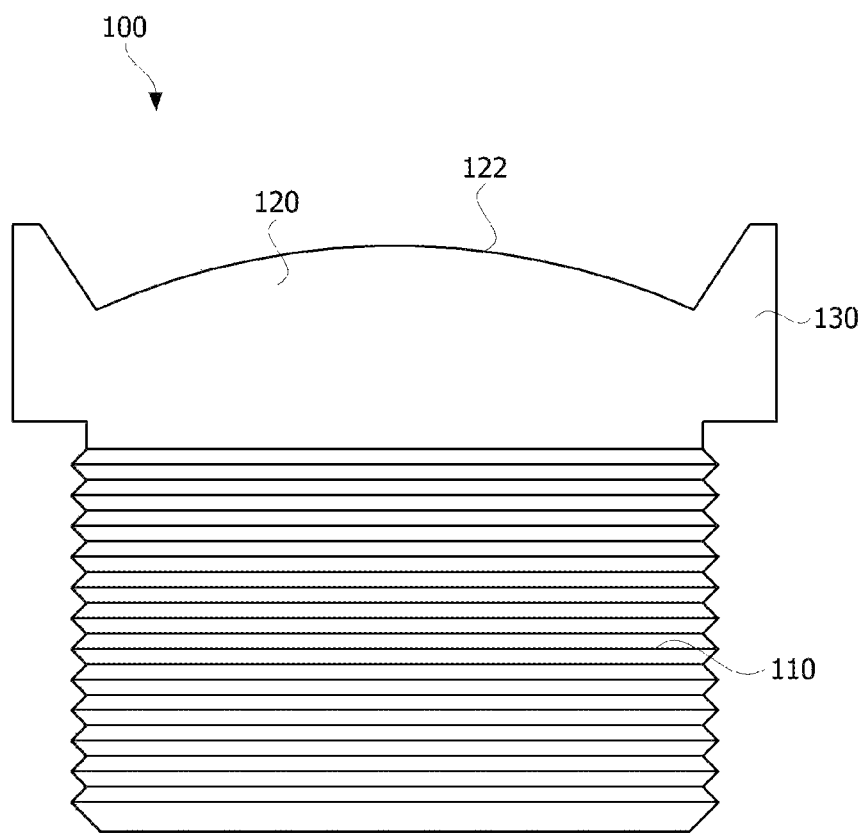
FIG. 1 is a diagram illustrating a lens assembly according to one embodiment of the present invention.

The present invention may be modified into various forms and may have a variety of embodiments, and, therefore, specific embodiments will be illustrated in the drawings and described. The embodiments, however, are not to be taken in a sense which limits the present invention to the specific embodiments, and should be construed to include modifications, equivalents, or substituents within the spirit and technical scope of the present invention.

Also, the terms including ordinal numbers such as first, second, and the like used herein may be used to describe various components, but the various components are not limited by the terms. The terms are used only for the purpose of distinguishing one component from another component. For example, without departing from the scope of the present invention, a second component may be referred to as a first component, and similarly, a first component may also be referred to as a second component. The term "and/or" includes a combination of a plurality of related listed items or any one item of the plurality of related listed items.

The terms used herein are employed to describe only specific embodiments and are not intended to limit the present invention. Unless the context clearly dictates otherwise, the singular form includes the plural form. It should be understood that the terms "comprise," "include," and "have" specify the presence of stated herein features, numbers, steps, operations, components, elements, or combinations thereof, but do not preclude the presence or possibility of adding one or more other features, numbers, steps, operations, components, elements, or combinations thereof.

Unless otherwise defined, all terms including technical or scientific terms used herein have the same meaning as commonly understood by those skilled in the art to which the present invention pertains. General terms that are defined in a dictionary shall be construed as having meanings that are consistent in the context of the relevant art, and are not to be interpreted as having an idealistic or excessively formalistic meaning unless clearly defined in the present application.

When a portion of a layer, film, region, plate, or the like is referred to as being "on" another portion, the description includes not only the case in which the portion is "directly on" the other portion, but also the case in which still another portion is interposed between the portion and the other portion. Conversely, when a portion is "directly on" another portion, there is no other portion between the portion and the other portion.

Figure 2:
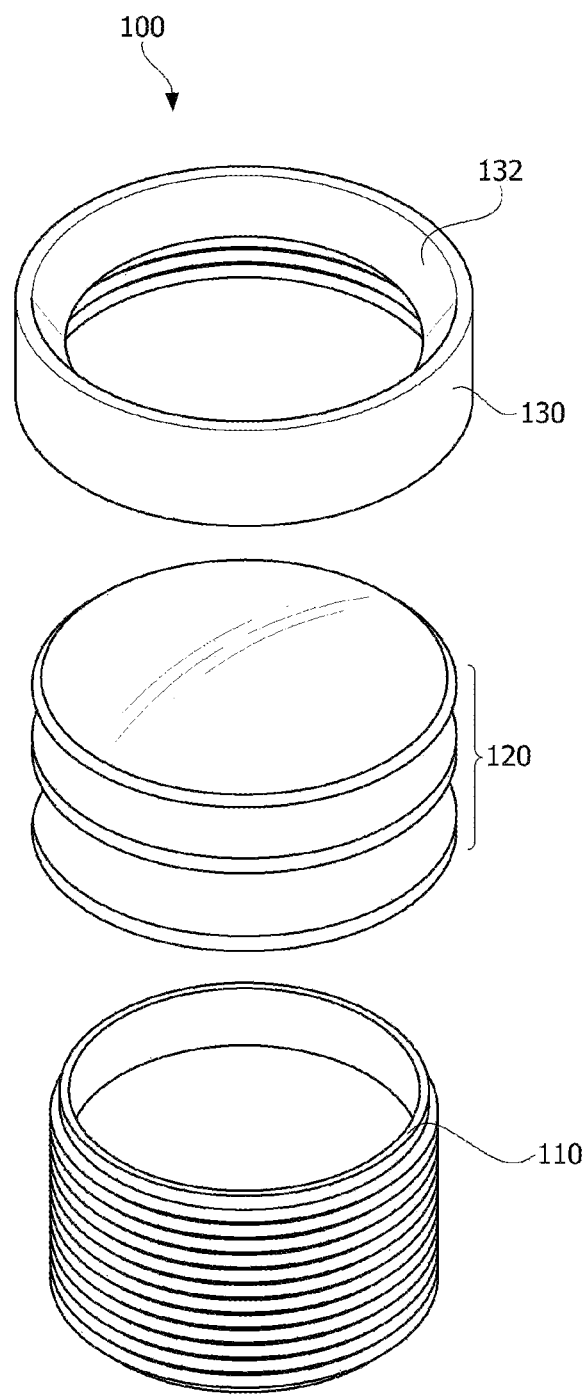
FIG. 2 is an exploded view of the lens assembly according to one embodiment of the present invention.

FIG. 1 is a diagram illustrating a lens assembly according to one embodiment of the present invention, and FIG. 2 is an exploded view of the lens assembly according to one embodiment of the present invention.

Referring to FIGS. 1 and 2, a lens assembly 100 includes a housing 110, a lens 120 accommodated in the housing 110, and a retainer 130 coupled to one end of the housing 110 and configured to support the lens 120.

Here, the lens 120 may include a plurality of lenses which are sequentially disposed from an object side to an image side. Each of the plurality of lenses may have a positive refractive power or a negative refractive power, and may have a convex surface, a concave surface, or a meniscus shape. The refractive powers and the surface shapes of the plurality of lenses may be variously combined according to a required focal length and the like.

The lens assembly according to one embodiment of the present invention may be included in a camera module, for example, a camera module for a vehicle. The camera module may include the lens assembly according to one embodiment of the present invention, a filter, an image sensor, and a printed circuit board. To this end, although not shown in the drawing, the filter, the image sensor, and the printed circuit board may be sequentially disposed behind the lens assembly. That is, the image sensor may be mounted on the printed circuit board, and the filter may be formed on the image sensor. Here, the image sensor may be connected to the printed circuit board by wires. The image sensor may be, for example, a charge-coupled device (CCD) or a complementary metal-oxide semiconductor (CMOS) sensor. Further, the filter may be an infrared (IR) filter. The filter may block near-IR rays, for example, light having a wavelength in a range of 700 nm to 1100 nm, among light incident on the camera module.

Meanwhile, one surface 122 of a lens (hereinafter, referred to as an outermost lens) among the plurality of lenses which is closest to an object side is exposed to the outside. When the one surface of the lens is exposed to an external environment such as rain, fog, and the like, an optical characteristic of the camera module may be degraded or a field of view thereof may be insufficiently secured.

Accordingly, there has been an attempt to coat a lens of a camera module with a water-repellent coating layer. When water repellent coating is performed on the camera module, water droplets on a lens aggregate together and flow down so that optical characteristic and a field of view of the camera module may be secured.

However, even in the case in which the water-repellent coating is performed, fine droplets cannot flow down and are formed on the lens in a foggy situation.

To ensure the field of view of the camera module even in the foggy situation, the lens may be coated with a hydrophilic coating layer. When hydrophilic coating is performed, water droplets on the lens are spread.

Meanwhile, at least one of the plurality of lenses, for example, the outermost lens, is supported by the retainer 130.

Figure 3:
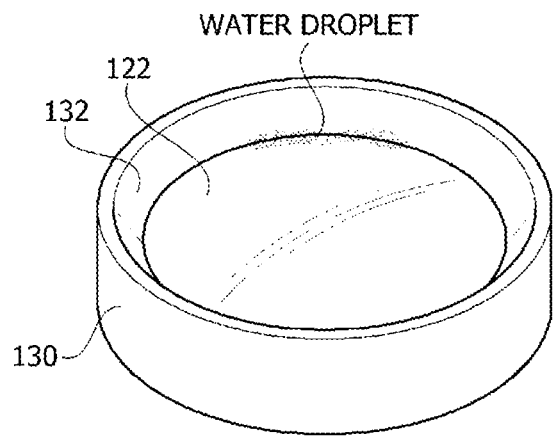
FIG. 3 is a diagram illustrating an example in which an outermost lens is fixed by a retainer.

FIG. 3 is a diagram illustrating an example in which the outermost lens is fixed by the retainer. At this point, the retainer 130 may include a sidewall 132 which protrudes outward, that is, in a direction of the object side, and surrounds an edge of a surface which is exposed to the outside among both surfaces of the outermost lens. Accordingly, the retainer 130 may support the outermost lens and may prevent the outermost lens from escaping from the housing. At this point, the sidewall 132 of the retainer 130 may be formed to be inclined with respect to a horizontal plane of the lens 120. Accordingly, a problem in that too much light is incident inside the lens assembly 100 may be prevented.

Meanwhile, when the surface among both of the surfaces of the outermost lens which is exposed to the outside has a convex surface, a recess may be formed around a boundary between the lens 120 and the retainer 130. When a hydrophilic coating layer is formed on the lens 120, fine water droplets spreading on the lens 120 may be moved into in the recess formed around the boundary between the lens 120 and the retainer 130.

According to one embodiment of the present invention, the coating layer is formed on the one surface exposed to the outside of the lens as well as on the retainer.

Figure 4:
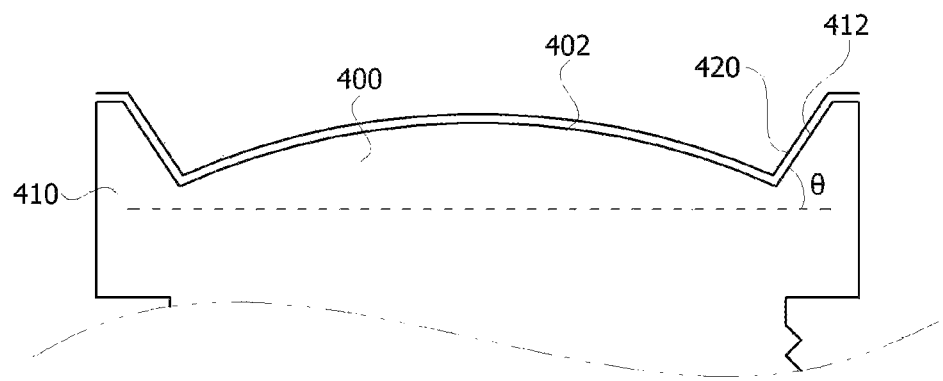
FIG. 4 is a diagram illustrating a lens and a retainer of the lens assembly according to one embodiment of the present invention.

FIG. 4 is a diagram illustrating a lens and a retainer of the lens assembly according to one embodiment of the present invention.

Referring to FIG. 4, a hydrophilic coating layer 420 is formed on one outwardly-exposed surface 402 of a lens 400 and on a retainer 410. At this point, the hydrophilic coating layer 420 may be integrally formed on the one outwardly-exposed surface 402 of the lens 400 and on a sidewall 412 of the retainer 410. As described above, when the hydrophilic coating layer 420 is formed on the one outwardly-exposed surface 402 of the lens 400 as well as on the sidewall 412 of the retainer 410, a phenomenon in which water is moved into in a recess formed around a boundary between the lens 400 and the retainer 410 may be prevented.

At this point, the hydrophilic coating layer 420 may have a thickness in a range of 1 nm to 100 nm, and preferably, in a range of 2 nm to 10 nm. When the thickness of the hydrophilic coating layer 420 is less than 1 nm, the hydrophilic coating layer 420 tends to wear and thus a hydrophilic property thereof may be degraded. Thus, reliability of the camera module may be lowered. On the other hand, when the thickness of the hydrophilic coating layer 420 exceeds 100 nm, a binding force between the hydrophilic coating layer 420 and the one outwardly-exposed surface 402 of the lens 400 may be weakened, and thus the hydrophilic coating layer 420 may be delaminated and the hydrophilic property may be degraded.

At this point, the hydrophilic coating layer 420 is coated using a hydrophilic coating solution and may be coated by dip-coating, spray coating, hand coating, or the like. The hydrophilic coating solution may contain 1 to 20 wt % of organic-inorganic oxide, 60 to 80 wt % of a solvent, and 1 to 20 wt % of a binder. Here, the organic-inorganic oxide may be an oxide containing an element selected from the group consisting of Si, K, P, Na, Al, Li, Sn, and Pt. The solvent may be water or an alcohol-based solvent. Alternatively, the hydrophilic coating solution may include a polymer resin having a hydrophilic functional group. The formation of the hydrophilic coating layer on the lens will be described below.

Meanwhile, the lens 400 and the retainer 410 may be made of different materials. For example, the lens 400 may include glass, while the retainer 410 may include plastic. Accordingly, when hydrophilic coating solutions having the same composition are applied to the lens and the retainer, adhesions of the hydrophilic coating solutions with respect to the lens and the retainer may be different. Accordingly, compositions of the hydrophilic coating solutions applied to the lens and the retainer may be different.

Meanwhile, an angle θ between the sidewall 412 of the retainer 410 and a horizontal plane of the lens 400 may be less than or equal to 20 degrees. When the angle θ between the sidewall 412 of the retainer 410 and the lens 400 exceeds 20 degrees, a phenomenon in which water droplets are formed around the boundary between the retainer 410 and the lens 400 may occur.

Figure 5:
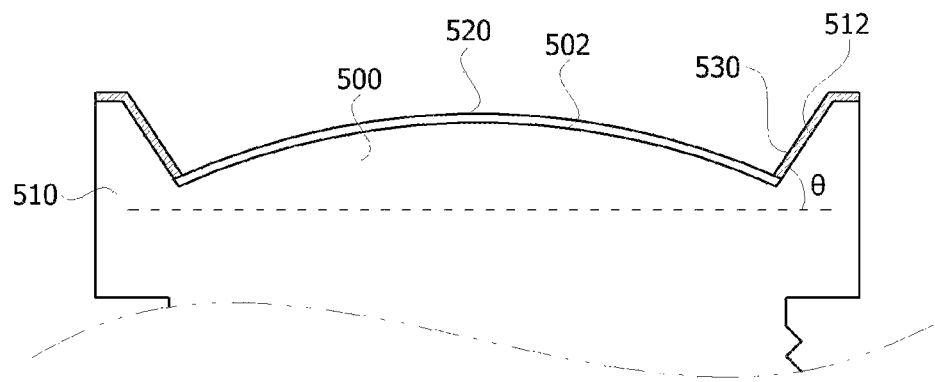
FIG. 5 is a diagram illustrating a lens and a retainer of a lens assembly according to another embodiment of the present invention.

FIG. 5 is a diagram illustrating a lens and a retainer of a lens assembly according to another embodiment of the present invention. Descriptions overlapping that of FIG. 4 will be omitted.

Referring to FIG. 5, a hydrophilic coating layer 520 is formed on one outwardly-exposed surface 502 of a lens 500, and a water-repellent coating layer 530 is formed on a retainer 510. As described above, when the hydrophilic coating layer 520 is formed on the one outwardly-exposed surface 502 of the lens 500, fine water droplets spread aside such that a field of view of a camera module may be secured. In addition, when the water-repellent coating layer 530 is formed on the retainer 510, water formed around a boundary between the lens 500 and the retainer 510 flows down such that an optical characteristic and the field of view of the camera module may be improved.

At this point, the hydrophilic coating layer 520 and the water-repellent coating layer 530 may each have a thickness in a range of 3 nm to 100 nm. When the thickness of each of the hydrophilic coating layer 520 and the water-repellent coating layer 530 is less than 3 nm, the hydrophilic coating layer 520 and the water-repellent coating layer 530 are likely to wear and a hydrophilic or water-repellent property thereof may be degraded. Accordingly, reliability of the camera module may be lowered. On the other hand, when the thickness of each of the hydrophilic coating layer 520 and the water-repellent coating layer 530 exceeds 100 nm, the hydrophilic coating layer 520 and the water-repellent coating layer 530 may be delaminated such that the hydrophilic or water-repellent property may be degraded.

Figure 6:
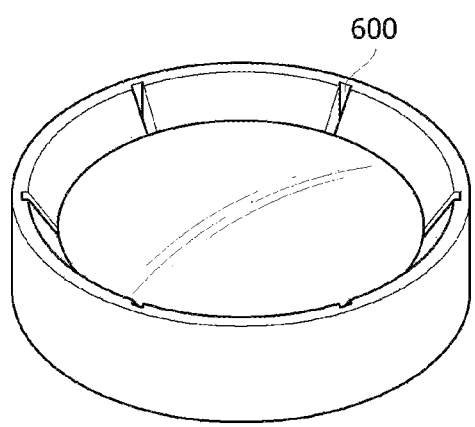
FIG. 6 is a diagram illustrating an example in which a recess is formed in a sidewall of a retainer.

Meanwhile, according to one embodiment of the present invention, a sidewall of the retainer may include a recess extending from the boundary between the lens and the sidewall in a direction toward an object. FIG. 6 is a diagram illustrating an example in which a recess is formed in a sidewall of a retainer. As shown in FIG. 6, when an outwardly extending recess 600 is formed in the sidewall of the retainer and then a hydrophilic coating layer or a water-repellent coating layer is formed thereon, water formed at a boundary between a lens and the retainer may be easily guided to the outside. Here, the recess 600 may have a V shape or a rounded shape.

Figure 7:
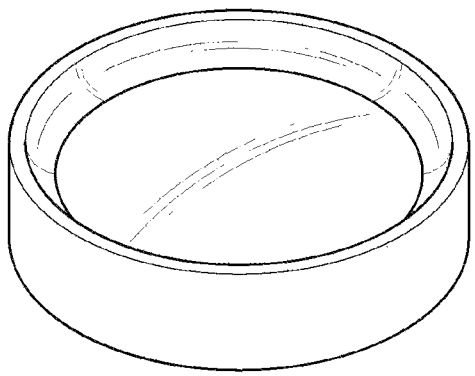
FIG. 7 is a diagram illustrating an example in which a sidewall of a retainer has a concave shape.

Further, according to another embodiment of the present invention, the sidewall of the retainer may have a concave shape. FIG. 7 is a diagram illustrating an example in which a sidewall of a retainer has a concave shape. As shown in FIG. 7, when the sidewall of the retainer has a concave shape and a hydrophilic coating layer or a water-repellent coating layer is formed on the sidewall of the retainer, water formed at a boundary between a lens and the retainer may be easily guided to the outside.

Figure 8:
FIGS. 8 to 14 are images taken by a camera module including a lens assembly according to examples and a comparative example.
Figure 9:

FIG. 8 illustrates an image which is taken by a camera module including an outermost lens on which a water-repellent coating layer and a hydrophilic coating layer are not formed, and FIG. 9 illustrates an image which is taken by a camera module including an outermost lens on which a water-repellent coating layer is formed. Further, FIG. 10 illustrates an image which is taken by a camera module including an outermost lens on which a hydrophilic coating layer is formed, and FIG. 11 illustrates an image which is taken by a camera module in which a hydrophilic coating layer is formed on an outermost lens and a retainer.

Figure 10:

When FIG. 9 and FIG. 10 are compared, the image taken by the camera module including the outermost lens on which the hydrophilic coating layer is formed is clearer than the image taken by the camera module including the outermost lens on which the water-repellent coating layer is formed. From the above description, it can be seen that the hydrophilic coating layer prevents condensation.

Figure 11:

Also, when FIG. 10 and FIG. 11 are compared, it can be seen that the image taken by the camera module in which the hydrophilic coating layer is formed on both the lens and the retainer is clearer than the image taken by the camera module in which the hydrophilic coating layer is formed on only the outermost lens. From the above description, it can be seen that formation of water droplets is prevented around a boundary between the outermost lens and the retainer.

Figure 12:
Figure 13:
Figure 14:
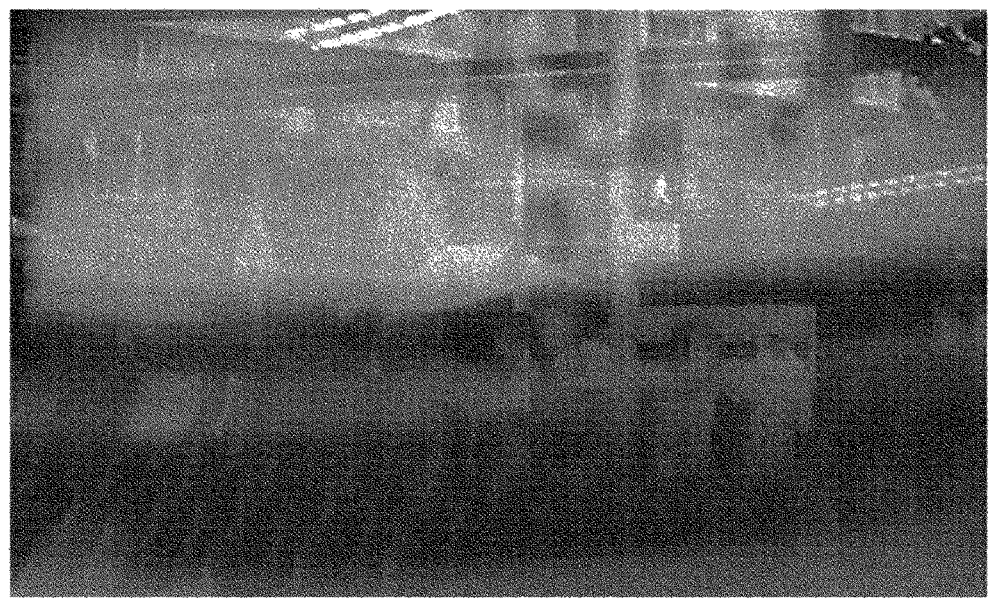

FIGS. 12 to 14 illustrate images taken by camera modules having different angles between a retainer and a lens. At this point, a hydrophilic coating layer is integrally formed on the retainer and the lens.

FIG. 12 illustrates an image taken by a camera module in which the angle θ between a sidewall of the retainer and a horizontal plane of the lens is 5 degrees, FIG. 13 illustrates an image taken by a camera module in which the angle θ between the retainer and the lens is 15 degrees, and FIG. 14 illustrates an image taken by a camera module in which the angle θ between the retainer and the lens is 25 degrees. Referring to FIGS. 12 to 14, it can be seen that, when the angle between the retainer and the lens exceeds 20 degrees, quality of the image is degraded due to generation of water droplets around a boundary between the retainer and the lens.

Hereinafter, formation of a hydrophilic coating layer on a lens will be described in detail.

Figure 15:
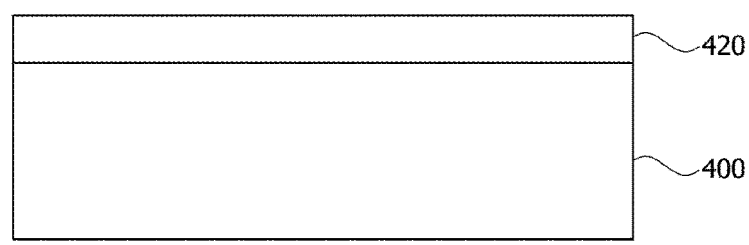
FIG. 15 is a cross-sectional view of a hydrophilic coating layer formed on a lens according to one embodiment of the present invention.

FIG. 15 is a cross-sectional view of a hydrophilic coating layer formed on a lens according to one embodiment of the present invention.

Referring to FIG. 15, a hydrophilic coating layer 420 containing a polymer having a hydrophilic functional group is formed on a lens 400. Here, a base material of the lens 400 may be glass or plastic, and the hydrophilic functional group contained in the polymer may be selected from the group consisting of a hydroxyl group (—OH), an amino group (—NH$_3$), and an epoxy group. As described above, when the hydrophilic coating layer 420 contains the polymer having the hydrophilic functional group, a surface of the lens 400 may have wettability or hydrophilicity. Particularly, when the hydrophilic functional group is bound to each monomer forming the polymer, a density of the hydrophilic functional group in the hydrophilic coating layer 420 may be increased such that the hydrophilic coating layer 420 may have a super-hydrophilic property. Accordingly, when water is dropped on the surface of the lens 400, that is, on the hydrophilic coating layer 420, a contact angle, which is a spreading angle, of the water may be maintained at 15 degrees or less, and preferably, may be maintained at 10 degrees or less.

Here, the base material of the lens 400 and the hydrophilic coating layer 420 may be covalently bound to each other. The base material of the lens 400 and the hydrophilic coating layer 420 may be covalently bound by, for example, the O of the lens 400 and the Si or C of the hydrophilic coating layer 420. To this end, when the lens 400 is a glass base material, the surface of the lens 400 may be plasma-treated, alkyl halide treated, or acid-base treated to activate the hydroxyl group (—OH). Accordingly, a binding force between the surface of the lens 400 and the hydrophilic coating layer 420 is strengthened such that durability and abrasion resistance thereof may be enhanced.

At this point, the hydrophilic coating layer 420 may have a thickness in a range of 1 nm to 100 nm, and preferably, in a range of 2 nm to 10 nm. When the thickness of the hydrophilic coating layer 420 is less than 1 nm, the hydrophilic coating layer 420 tends to wear and an amount of the hydrophilic functional group included therein is small such that the hydrophilic property may be degraded. Accordingly, reliability of the camera module may be lowered. On the other hand, when the thickness of the hydrophilic coating layer 420 exceeds 100 nm, a binding force between the surface of the lens 400 and the hydrophilic coating layer 420 may be weakened, and thus the hydrophilic coating layer 420 may be delaminated and the hydrophilic property may be degraded.

Figure 16:
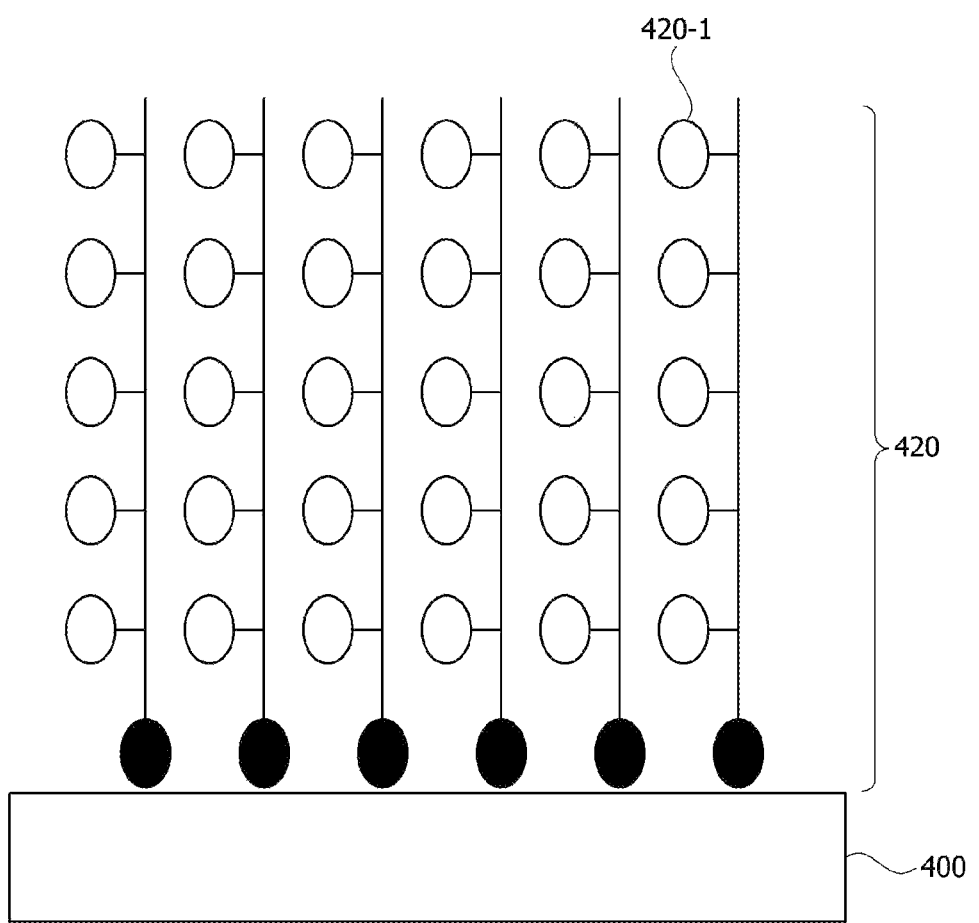
FIG. 16 is a schematic diagram of a lens which is hydrophilically coated with a brush type polymer according to one embodiment of the present invention.
Figure 17:
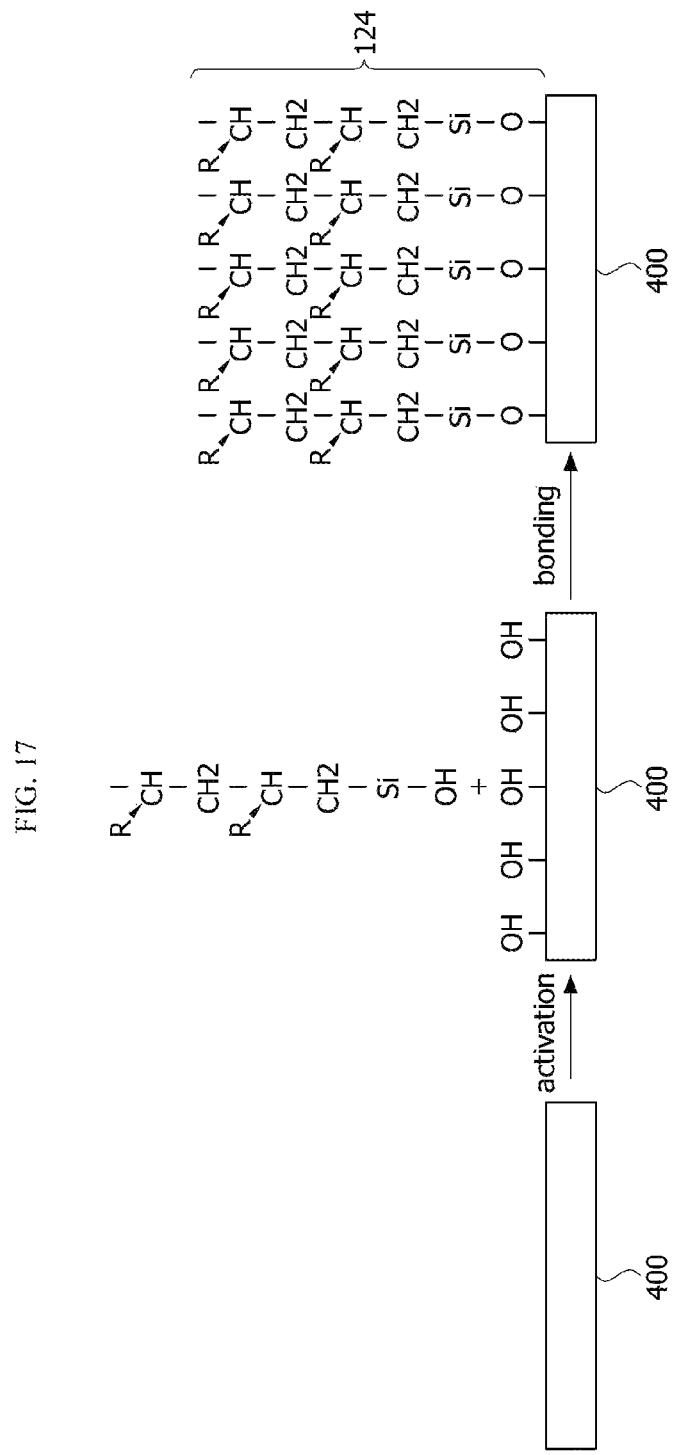
FIG. 17 is a diagram illustrating an example of a hydrophilic coating method of FIG. 16.
Figure 18:
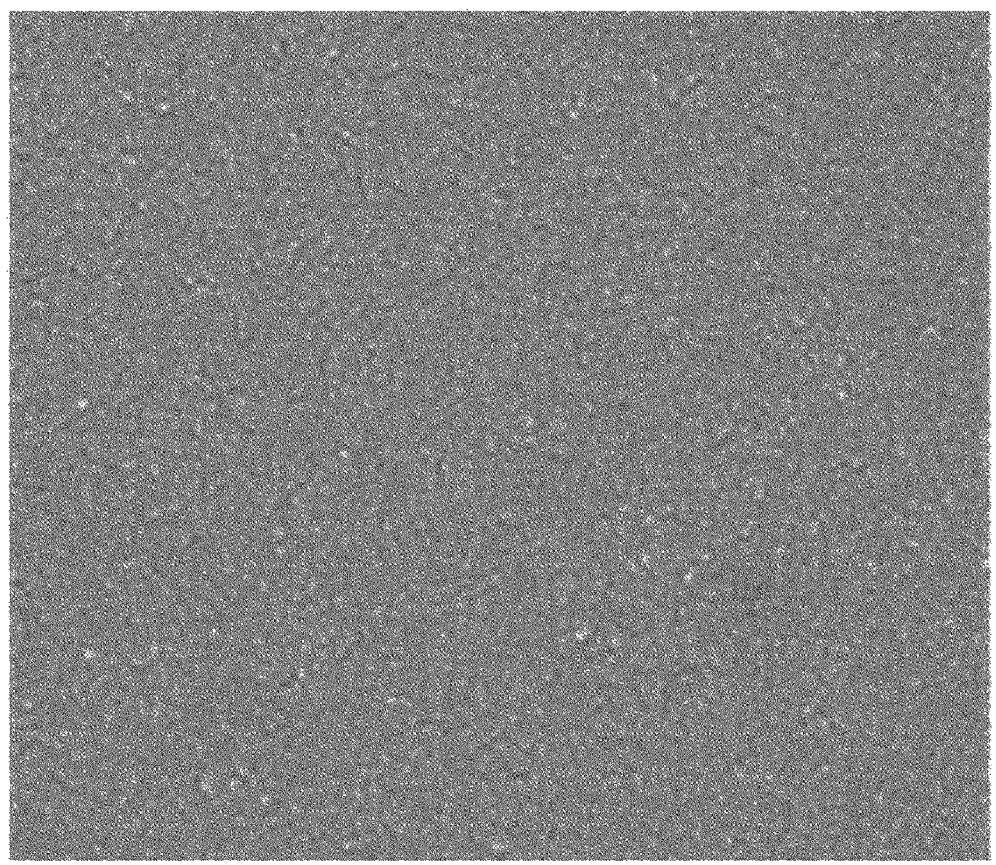
FIG. 18 is a scanning electron microscope (SEM) photograph of a lens surface coated according to the method of FIG. 17.
Figure 19:
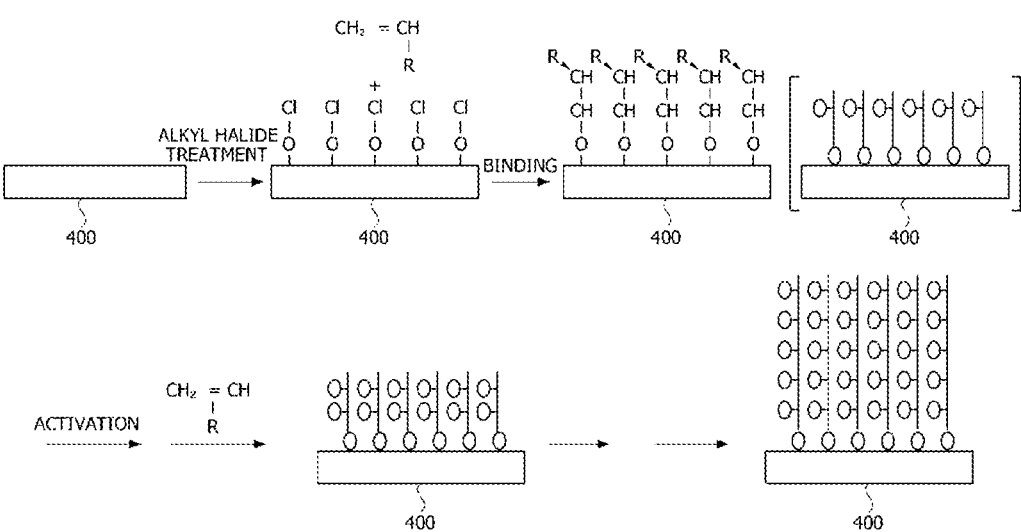
FIG. 19 is a diagram illustrating another example of the hydrophilic coating method of FIG. 16.
Figure 20:
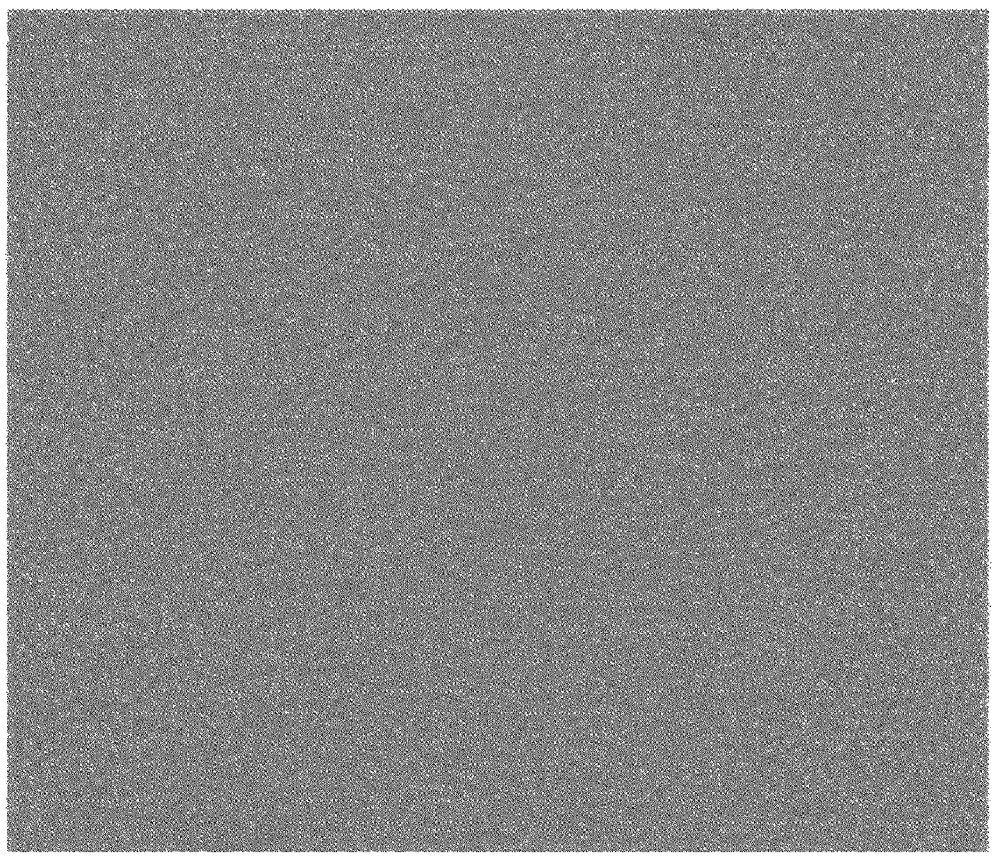
FIG. 20 is an SEM photograph of a lens surface coated according to the method of FIG. 19.

FIG. 16 is a schematic diagram of a lens which is hydrophilically coated with a brush type polymer according to one embodiment of the present invention, FIG. 17 is a diagram illustrating an example of a hydrophilic coating method of FIG. 16, FIG. 18 is a scanning electron microscope (SEM) photograph of a lens surface coated according to the method of FIG. 17, FIG. 19 is a diagram illustrating another example of the hydrophilic coating method of FIG. 16, and FIG. 20 is a SEM photograph of a lens surface coated according to the method of FIG. 19.

Referring to FIG. 16, a brush type polymer containing a hydrophilic functional group 420-1 is bound to the surface of the lens 400.

To this end, referring to FIG. 17, the surface of the lens 400 is cleaned and then activated. To activate the surface of the lens 400, a plasma treatment, an alkyl halide treatment, or an acid-base treatment may be performed thereon. When the surface of the lens 400 is subjected to the plasma treatment, the alkyl halide treatment, or the acid-base treatment, a hydroxyl group (—OH) on the surface of the lens 400 is activated.

Then, when a polymer containing a hydroxyl group (—OH) is added to the surface of the lens 400, the hydroxyl group activated on the surface of the lens 400 and the hydroxyl group contained in the polymer react such that the lens 400 and the polymer may be covalently bound to each other. At this point, the polymer contains a hydrophilic functional group (—R). Here, the hydrophilic functional group may be selected from the group consisting of, for example, a hydroxyl group, an amino group, and an epoxy group.

Referring to FIG. 19, in another method of forming a brush type polymer on the surface of the lens 400, the lens 400 is cleaned and then activated. To activate the surface of the lens 400, a plasma treatment, an alkyl halide treatment, or an acid-base treatment may be performed thereon.

Then, when a monomer containing a hydrophilic functional group (—R) is applied on the surface of the lens 400, the monomer is bound to the activated surface of the lens 400. For example, as shown in FIG. 19, when the surface of the lens 400 is treated with an alkyl halide, a chloride (—Cl) on the surface of the lens 400 is activated. When a monomer having a double binding is added to the activated surface of the lens, the double binding of the monomer is activated to separate the —Cl, and the monomer and the surface of the lens 400 are bound to each other. Then, when the surface of the lens 400 to which the monomer is bound is reactivated and a monomer containing a hydrophilic functional group is added to the surface of the lens, the monomer is bound again to the activated surface of the lens 400. When such processes are repeatedly performed, the monomer containing the hydrophilic functional group may be polymerized to form the brush type polymer. Here, the hydrophilic functional group may be selected from the group consisting of, for example, a hydroxyl group, an amino group, and an epoxy group. As shown in FIGS. 19 and 20, when the monomer is repeatedly added to the surface of the lens 400 to be polymerized as the polymer, a hydrophilic property thereof is superior since a density of the hydrophilic functional group is higher than that of the hydrophilic functional group when the polymer is directly bound to the surface of the lens 400 as shown in FIGS. 17 and 18.

Figure 21:
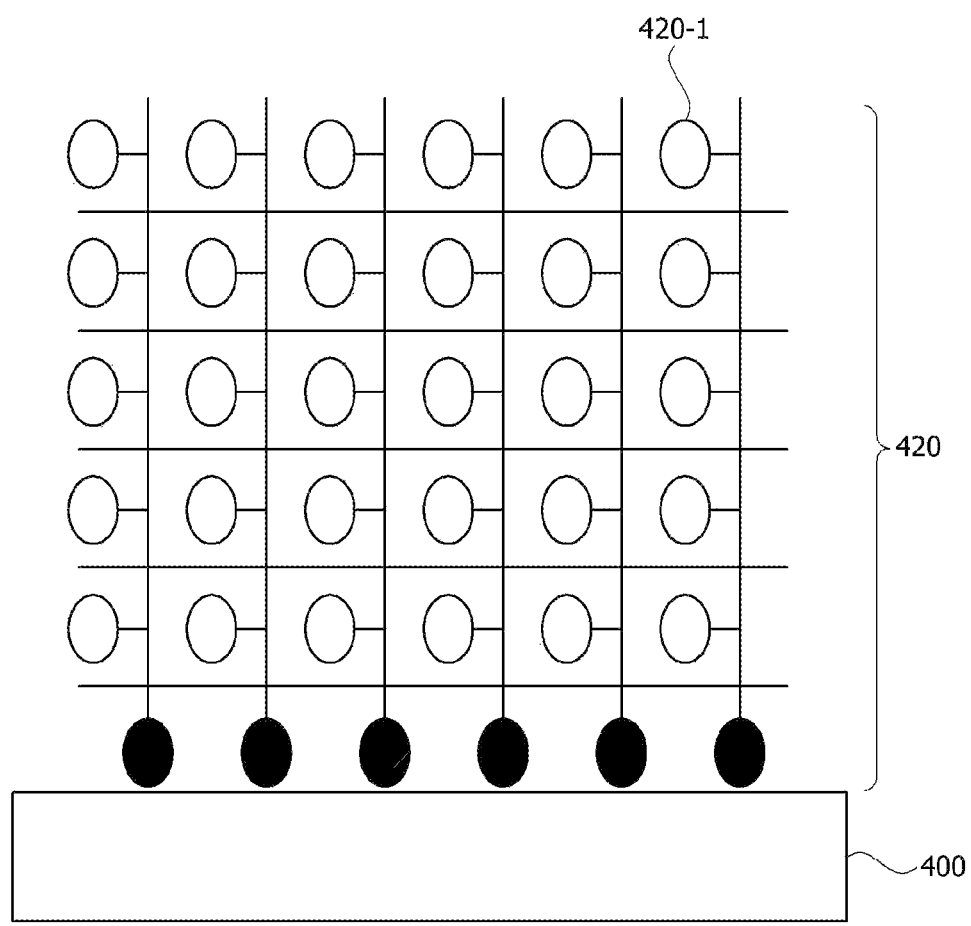
FIG. 21 is a schematic diagram of a lens which is hydrophilically coated with a ladder type polymer according to another embodiment of the present invention.
Figure 22:
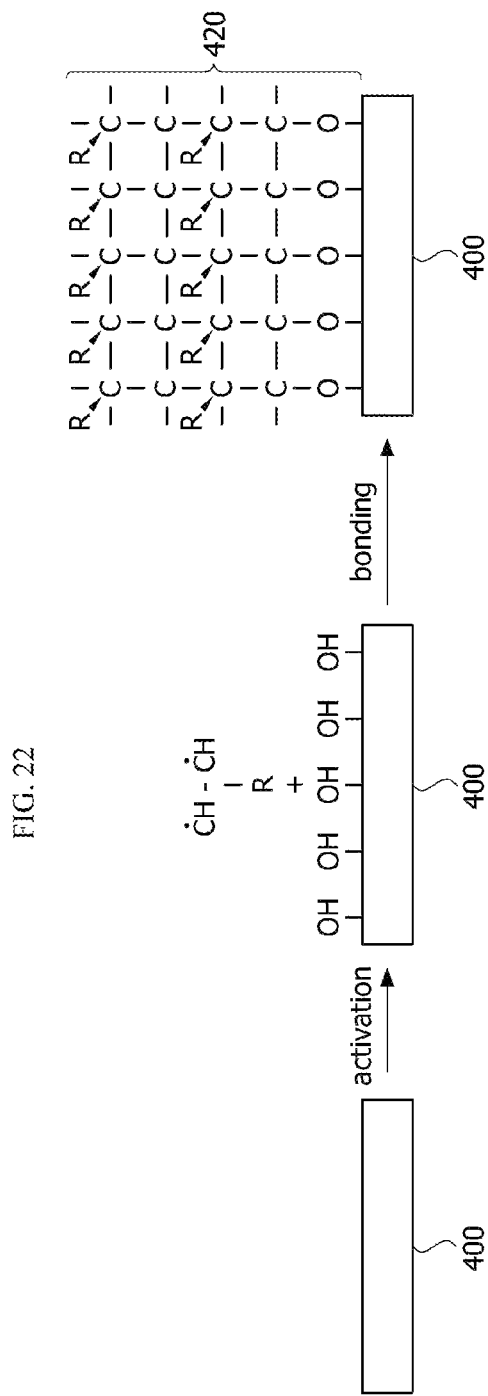
FIG. 22 is a diagram illustrating an example of a hydrophilic coating method of FIG. 21.
Figure 23:
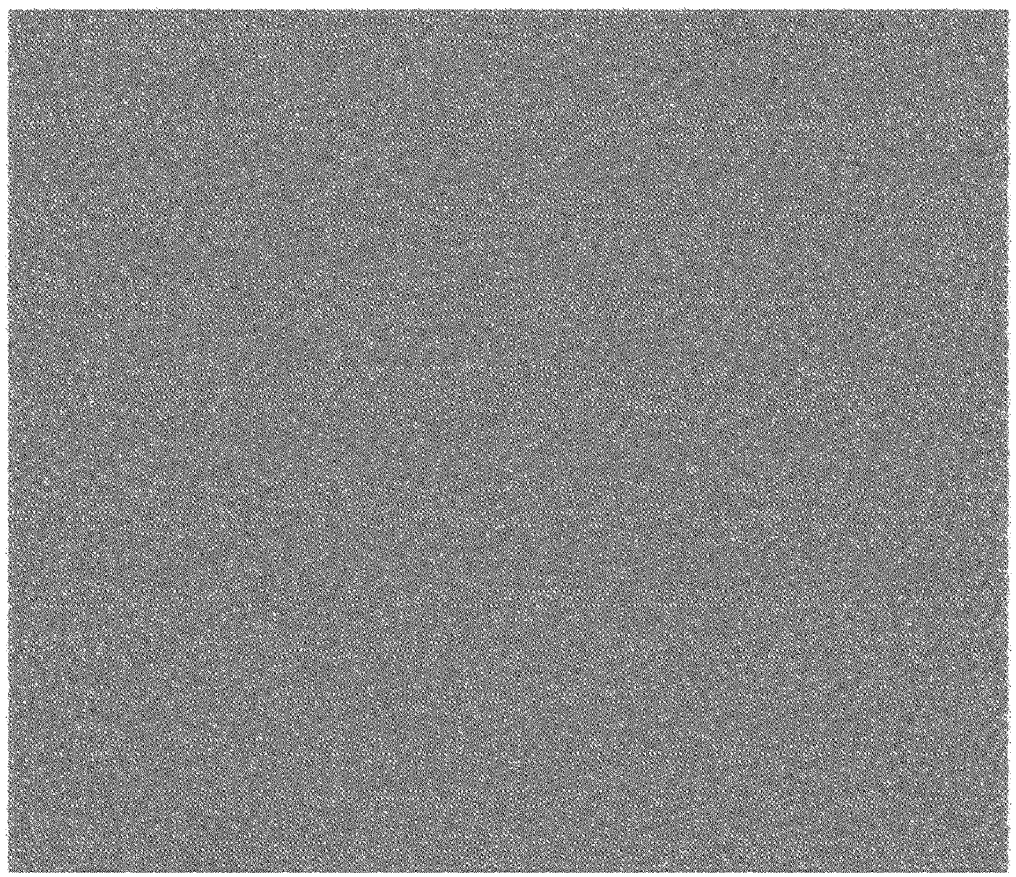
FIG. 23 is an SEM photograph of a lens surface which is coated according to the method of FIG. 22.

FIG. 21 is a schematic diagram of a lens which is hydrophilically coated with a ladder type polymer according to another embodiment of the present invention, FIG. 22 is a diagram illustrating an example of a hydrophilic coating method of FIG. 21, and FIG. 23 is a SEM photograph of a lens surface which is coated according to the method of FIG. 22.

Referring to FIG. 21, a ladder type polymer containing the hydrophilic functional group 420-1 is bound to the surface of the lens 400.

To this end, referring to FIG. 22, the surface of the lens 400 is cleaned and then activated. To activate the surface of the lens 400, a plasma treatment, an alkyl halide treatment, or an acid-base treatment may be performed thereon. When the surface of the lens 400 is subjected to the plasma treatment, the alkyl halide treatment, or the acid-base treatment, a hydroxyl group (—OH) on the surface of the lens 400 is activated.

Then, when a radical containing a hydrophilic functional group (—R) is applied to the surface of the lens 400, the hydroxyl group (—OH) activated on the surface of the lens 400 and the radical containing the hydrophilic functional group react on the surface of the lens 400. Since the radical is highly reactive, the radical may continuously grow on the surface of the lens 400 to form the ladder type polymer. Here, the hydrophilic functional group may be selected from the group consisting of, for example, a hydroxyl group, an amino group, and an epoxy group.

As shown in FIGS. 19 to 23, when a hydrophilic coating layer is formed by monomer polymerization or radical polymerization, since a binding force between a base material thereof and the hydrophilic coating layer and a density of the hydrophilic functional group in the hydrophilic coating layer are high, abrasion resistance and a hydrophilic property may be high.

A contact angle, transmittance, a contact angle after an abrasion resistance test, a contact angle after a thermal resistance test, and a contact angle after a thermal shock test were respectively measured according to a comparative example and examples.

The comparative example is an example in which a hydrophilic coating layer was formed on a base material according to a $TiO_2$-based inorganic nano-coating method, Example 1 is an example in which a glass base material was activated and then a polymer containing a hydroxyl group, which is a hydrophilic functional group, was bound to the glass base material to form a hydrophilic coating layer as in the method of FIG. 17, Example 2 is an example in which a glass base material was activated and then a monomer containing a hydroxyl group, which is a hydrophilic functional group, was polymerized to form a hydrophilic coating layer as in the method of FIG. 19, and Example 3 is an example in which a glass base material was activated and then a radical containing a hydroxyl group, which is a hydrophilic functional group, was polymerized to form a hydrophilic coating layer.

To compare the comparative example with Examples 1 to 3, contact angles at which water spreads were measured after water was sprayed on surfaces of lenses manufactured according to the comparative example and Examples 1 to 3. Further, to compare contact angles after an abrasion resistance test, the surfaces of the lenses manufactured according to the comparative example and Examples 1 to 3 were rubbed using a canvas cloth having a length of 100±5 mm 1,500 times with a force of 4.9 N and then the contact angles at which water spreads were measured after water was sprayed on the worn surfaces of the lenses. Further, to compare contact angles after the thermal resistance test, the lenses manufactured according to the comparative example and Examples 1 to 3 were treated at 40° C. and 80° C. for 1000 cycles, and then contact angles at which water spreads were measured after water was sprayed. In addition, to compare contact angles after a thermal shock test, the lenses were treated 50 times at 80° C. and −40° C. at 95% humidity for 5 cycles, and then contact angles at which water spreads were measured after the water was sprayed. Here, each of the contact angles may refer to an angle that is formed by a horizontal plane of a lens, that is, a plane perpendicular to an axis toward an object, and an interface between a surface of the lens and water.

Table 1 shows the results.

TABLE 1

| Test Item | Comparative Example | Example 1 | Example 2 | Example 3 |
|---|---|---|---|---|
| Contact Angle | 30° or more | 7 to 13° | 5 to 9° | 5 to 10° |
| Transmittance | 91% or more | 91% or more | 91% or more | 91% or more |
| Contact Angle after Abrasion Resistance Test | 30 to 50° | 15 to 22° | 5 to 10° | 8 to 12° |
| Contact Angle after Thermal Resistance Test | 30° or more | 8 to 18° | 7 to 12° | 7 to 10° |
| Contact Angle after Thermal Shock Test | 30° or more | 15 to 25° | 7 to 11° | 8 to 15° |

Referring to Table 1, it can be seen that, when compared with the comparative example in which the surface of the lens was hydrophilically coated by the $TiO_2$-based inorganic nano-coating method, the contact angle was lower in each of Examples 1 to 3 in which the surface of the lens was hydrophilically coated by using a polymer. Since the contact angle is an angle at which water which is dropped on the surface of the lens spreads, the lower the contact angle, the better the hydrophilic property. Accordingly, it can be seen that the hydrophilic property in each of Examples 1 to 3 was superior to that in the comparative example. In addition, according to Examples 1 to 3, since the contact angle is 30° or less even after the abrasion resistance test, it can be seen that the binding strength of the hydrophilic coating layer is higher than that of the comparative example.

As has been described above, while the description has been made with reference to the preferred embodiments of the present invention, it should be understood that various alternations and modifications of the present invention can be devised by those skilled in the art within a range not departing from the spirit and scope of the present invention, which are defined by the appended claims.

The invention claimed is:

1. A lens assembly comprising:
   a housing;
   a lens accommodated in the housing;
   a retainer coupled to one end of the housing and configured to support the lens; and
   a hydrophilic coating layer formed on one surface of the lens and formed on the retainer,
   wherein the hydrophilic coating layer includes a polymer containing a hydrophilic functional group, and wherein the hydrophilic functional group is selected from the group consisting of a hydroxyl group, an amino group, and an epoxy group.

2. The lens assembly of claim 1, wherein the one surface of the lens is a surface that is exposed to the outside.

3. The lens assembly of claim 2, wherein the retainer includes a sidewall configured to surround an edge of the surface that is exposed to the outside and protrude in a direction toward an object side.

4. The lens assembly of claim 3, wherein the sidewall is inclined with respect to a horizontal plane of the lens.

5. The lens assembly of claim 4, wherein an angle formed by the sidewall and the horizontal plane of the lens is 20 degrees or less.

6. The lens assembly of claim 3, wherein the sidewall includes a recess extending from a boundary between the lens and the sidewall in the direction toward the object side.

7. The lens assembly of claim 3, wherein the sidewall has a concave shape.

8. The lens assembly of claim 1, wherein the hydrophilic coating layer has a thickness in a range of 1 nm to 100 nm.

9. The lens assembly of claim 1, wherein the hydrophilic functional group is bound to each monomer forming the polymer.

10. The lens assembly of claim 1, wherein the lens and the hydrophilic coating layer are covalently bound to each other.

11. The lens assembly of claim 10, wherein the lens and the hydrophilic coating layer are covalently bound to each other by O of the lens and Si or C of the hydrophilic coating layer.

12. The lens assembly of claim 1, wherein a contact angle of the surface of the lens is 15 degrees or less, and wherein the contact angle is a spreading angle of the water.

13. A lens assembly comprising:
a housing;
a lens accommodated in the housing;
a retainer coupled to one end of the housing and configured to support the lens;
a hydrophilic coating layer formed on one surface of the lens; and
a water-repellent coating layer formed on the retainer.

14. The lens assembly of claim 13, wherein the one surface of the lens is a surface that is exposed to the outside.

15. The lens assembly of claim 14, wherein the retainer includes a sidewall configured to surround an edge of the surface that is exposed to the outside and protrude in a direction toward an object side.

16. The lens assembly of claim 15, wherein the sidewall is inclined with respect to a horizontal plane of the lens.

17. The lens assembly of claim 16, wherein an angle formed by the sidewall and the horizontal plane of the lens is 20 degrees or less.

18. The lens assembly of claim 15, wherein the sidewall includes a recess extending from a boundary between the lens and the sidewall in the direction toward the object side.

19. The lens assembly of claim 15, wherein the sidewall has a concave shape.

20. The lens assembly of claim 13, wherein each of the hydrophilic coating layer and the water-repellent coating layer has a thickness in a range of 1 nm to 100 nm.

* * * * *